No. 784,684. PATENTED MAR. 14, 1905.
A. KARLSEN.
DEVICE FOR PROTECTING TREES.
APPLICATION FILED FEB. 8, 1904.

Witnesses:

Inventor:
Adolf Karlsen
by H. Bevielson
Attorney

No. 784,684. Patented March 14, 1905.

UNITED STATES PATENT OFFICE.

ADOLF KARLSEN, OF RÖKEN, NEAR CHRISTIANIA, NORWAY.

DEVICE FOR PROTECTING TREES.

SPECIFICATION forming part of Letters Patent No. 784,684, dated March 14, 1905.

Application filed February 8, 1904. Serial No. 192,690.

*To all whom it may concern:*

Be it known that I, ADOLF KARLSEN, headman, a citizen of the Kingdom of Norway, and a resident of Nœrsnœs, Röken, near Christiania, Norway, have invented certain new and useful Improvements in Devices for Protecting Trees and Shrubs Against Insects, of which the following is a specification.

My invention has for its object to provide a device which serves to protect in an effective manner all sorts of trees or shrubs against insects which from the ground creep up the trunk and search for their food in the leaves or fruits, so that these latter or the tree itself are damaged.

My improved device is specially adapted for protecting orchard-trees.

The invention is illustrated in the accompanying drawings, in which—

Figure 1:
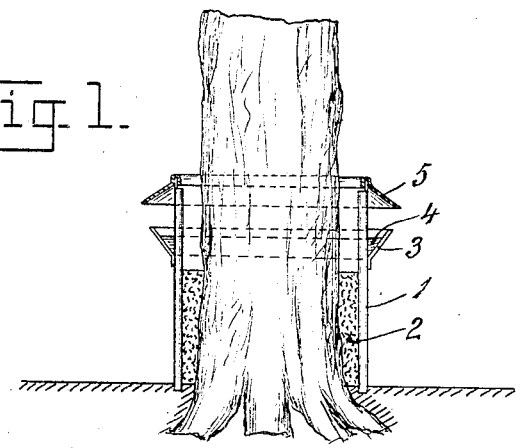
Figure 2:
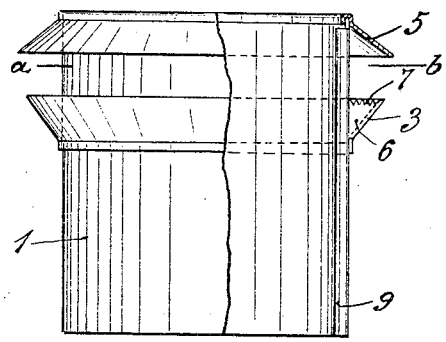
Figure 3:
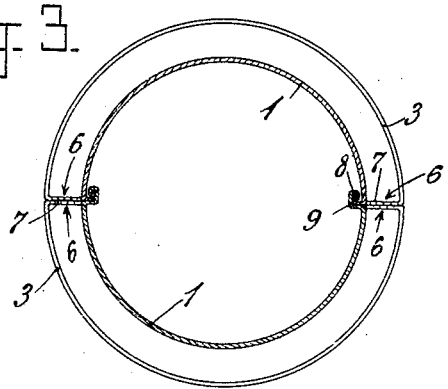
Figure 4:
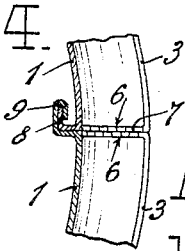

Figure 1 is a view of the apparatus seen in protecting position around a tree. Fig. 2 is a side elevation of the device, a portion of one half being removed. Fig. 3 is a cross-sectional view along the line $a\,b$ in Fig. 2, and Fig. 4 is a section in larger scale showing in detail a part of Fig. 3.

The device consists in a sleeve 1, the diameter of which is a little larger than that of the tree near the ground, so that it can be pressed down in the earth, as shown in Fig. 1. The space hereby formed between the trunk and the sleeve is filled with finely-pounded chalk 2 or other suitable material. On the sleeve is on its outside fixed an inclined plate 3, forming an annular channel which is filled with any sort of adhesive fluid, in which the insects may be drowned or held back. At the upper edge of the sleeve is attached a screen 5, which prevents leaves, sand, rain, &c., from covering the channel or making the adhesive fluid inefficacious.

By means of the chalk mass 2 insects—such as ants, beetles, moths, &c.—are prevented from creeping up the trunk inside the sleeve, and outside this latter the insects must necessarily pass the adhesive fluid 4, by which they will be held back. Such a sleeve may be produced, for instance, of clay and is preferably set over young trees before they have grown large, whereby the sleeve may for many years protect the tree against the most mischievous insects. If the question, however, is to protect larger trees, the sleeve has to be manufactured in two parts, (see Figs. 2, 3, and 4,) each part being provided with a channel 3, which is closed at the ends by means of walls 6. These latter are preferably at the upper edges formed with sharp peaks 7 and may be coated with a very viscous and adhesive material, so as to prevent the insects from passing the channel along the walls 6. The two parts of the sleeve may be held together by a seam, as indicated in Fig. 4. For this purpose one of the sleeve parts is along its sides provided with a backwardly-bent longitudinal rim 8, around which catches a correspondingly-formed rim 9, fixed longitudinally to the other sleeve part. In this manner the parts may be readily separated and connected together by moving them in relation to each other in axial direction.

Having now described my invention, what I claim as new, and desire to secure by Letters Patent, is—

In a device of the character described, a sleeve made in two semicircular sections, detachably secured together, one of said sections being provided with a longitudinal rim, and the other section with an engaging portion to permit the two sections to be connected by sliding one section upon the other longitudinally, substantially as described.

In testimony whereof I have hereunto affixed my signature this 26th day of January, 1904, in the presence of two witnesses.

ADOLF KARLSEN.

Witnesses:
 AUGUST HAAVALDSEN,
 AXEL LAHN.